United States Patent [19]

Getson et al.

[11] 4,111,890

[45] Sep. 5, 1978

[54] CURABLE ORGANOPOLYSILOXANE COMPOSITIONS CONTAINING TITANIUM ESTERS

[75] Inventors: John C. Getson; Wendell L. Johnson, both of Adrian, Mich.

[73] Assignee: SWS Silicones Corporation, Adrian, Mich.

[21] Appl. No.: 861,769

[22] Filed: Dec. 19, 1977

[51] Int. Cl.$^2$ .............................................. C08L 83/06
[52] U.S. Cl. .............................. 260/37 SB; 428/447; 428/450; 528/10
[58] Field of Search ................ 260/46.5 G, 46.5 E, 260/37 SB

[56] References Cited

U.S. PATENT DOCUMENTS

| | | | |
|---|---|---|---|
| 3,151,099 | 9/1964 | Ceyzeriat et al. | 260/46.5 R |
| 3,161,614 | 12/1964 | Brown et al. | 260/46.5 R |
| 3,378,520 | 4/1968 | Sattlegger et al. | 260/46.5 G |
| 3,409,573 | 11/1968 | Guinet et al. | 260/46.5 G |
| 3,922,246 | 11/1975 | Ceyzeriat et al. | 260/46.5 G |

*Primary Examiner*—Melvyn I. Marquis

[57] ABSTRACT

An organopolysiloxane composition which is stable under anhydrous conditions, but when exposed to atmospheric moisture cures to an elastomeric solid comprising (1) a hydrocarbonoxy terminated linear organopolysiloxane having at least two hydrocarbonoxy groups per molecule, (2) an organosilicon compound or partial hydrolyzates thereof containing at least two hydrocarbonoxy groups and (3) a titanium ester or partial hydrolyzates thereof in which the hydrocarbonoxy groups linked to the organopolysiloxane, organosilicon compound and the titanium ester groups are the same.

20 Claims, No Drawings

CURABLE ORGANOPOLYSILOXANE COMPOSITIONS CONTAINING TITANIUM ESTERS

The present invention relates to an organopolysiloxane composition and more particularly to an organopolysiloxane composition which is curable at room temperature in the presence of atmospheric moisture to form an elastomeric solid. More particularly the invention relates to a method for preparing a composition having extended shelf-life and which maintains its property profile after storage for several days or months.

BACKGROUND OF THE INVENTION

Room temperature curable compositions containing organopolysiloxanes, organosilicon compounds and titanium compounds are known in the art. For example, organopolysiloxane compositions which are capable of being converted into elastomeric solids in the presence of moisture are disclosed in U.S. Pat. No. 3,151,099. The compositions described in this patent contain a hydroxyl-terminated linear organopolysiloxane liquid, a silicic ester, a titanic ester and if desired, inert fillers and liquid diluents. Also U.S. Pat. No. 3,378,520 discloses a room temperature curable composition containing an alkoxy-terminated organopolysiloxane, a silane crosslinking agent containing at least three Sn-N bonded carboxylic acid amide radicals and a titanium complex which is obtained from the reaction of a titanium alcoholate with a difunctional keto compound. Vulcanizable compositions containing hydroxylated α,ω-diorganopolysiloxanes, a crosslinking agent and a catalyst which is obtained from the reaction of a diorganotin dicarboxylate and an orthotitanic ester are disclosed in U.S. Pat. No. 3,409,573. Compositions which are curable in the presence of moisture containing alkoxy-terminated diorganopolysiloxanes and titanium esters as catalysts are also disclosed in U.S. Pat. No. 3,161,614.

It has now been found that the compositions described above have a short shelf-life even when kept under substantially anhydrous conditions, and that the longer these compositions are stored, the lower the property profile becomes.

Therefore it is an object of this invention to provide an organopolysiloxane composition which is curable in the presence of ambient moisture. Another object of this invention is to provide an organopolysiloxane composition which is storage stable for long periods of time. Still another object of this invention is to provide an organopolysiloxane composition which maintains its property profile even after storage for several months. A further object of this invention is to provide a curable organopolysiloxane composition which is non corrosive. A still further object of this invention is to provide a process for preparing a storage stable organopolysiloxane composition which maintains its property profile when cured in the presence of ambient moisture to form an elastomeric solid.

SUMMARY OF INVENTION

The foregoing objects and others which will become apparent from the following description are accomplished in accordance with this invention, generally speaking, by providing a composition which is stable under anhydrous conditions, but cures to an elastomeric solid when exposed to moisture comprising (1) a hydrocarbonoxy-terminated organopolysiloxane having at least two hydrocarbonoxy groups per molecule, (2) an organosilicon compound having at least two hydrocarbonoxy groups per molecule and (3) a titanium ester or hydrolyzates thereof in which the hydrocarbonoxy groups linked to the silicon atoms and the titanium atoms are the same.

DETAILED DESCRIPTION OF THE INVENTION

The organopolysiloxanes containing hydrocarbonoxy groups may be represented by the general formula

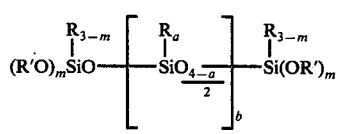

wherein R which may be the same or different represents monovalent hydrocarbon radicals, halogenated monovalent hydrocarbon radicals and cyanoalkyl radicals, R' is an aliphatic hydrocarbon radical having up to 10 carbon atoms, $a$ has an average value of from 1.9 to 2.0, $b$ has a value greater than 10 and $m$ has a value of at least 1, and preferably 2 or 3.

Examples of suitable monovalent hydrocarbon radicals are alkyl radicals having from 1 to 18 carbon atoms, such as methyl, ethyl, propyl, butyl, hexyl, octyl, decyl and octadecyl radicals; cycloalkyl radicals such as the cyclopentyl and cyclohexyl radicals; aryl radicals such as the phenyl and naphthyl radicals, aralkyl radicals such as the benzyl radical, the alpha-,beta-phenyl ethyl radicals and the alpha-,beta-phenyl propyl radicals; alkaryl radicals such as the tolyl,xylyl and ethylphenyl radicals; halogenated derivatives of the aforesaid radicals including chloromethyl, trifluoromethyl, chloropropyl, chlorophenyl, dibromophenyl, tetrachlorophenyl and difluorophenyl radicals; and cyanoalkyl radicals such as beta-cyanoethyl, gamma-cyanopropyl and beta-cyanopropyl radicals. It is preferred that the R groups in Formula I have from 1 to 3 carbon atoms and more preferably that R be a methyl radical. Formula I is intended to include those materials wherein the R groups are mixtures of the aforesaid radicals. Examples of aliphatic hydrocarbon radicals represented by R' are alkyl radicals, such as methyl, ethyl, propyl, butyl, hexyl, octyl and decyl radicals. For purposes of this invention, the organopolysiloxanes represented by Formula I above have a viscosity in the range of from 50 to 1,000,000 centipoise at 25° C, and more preferably from 50 to 500,000 centipoise at 25° C.

It is understood, that Formula I is intended to include organopolysiloxanes which have terminal OR' groups and also contain OR' groups along the chain. It is preferred that the organopolysiloxanes contain at least two silicon bonded OR' groups per molecule, especially if the resultant composition is to be converted to an elastomer.

A preferred class of organopolysiloxanes within the scope of Formula I above are those referred to as OR' terminated diorganopolysiloxanes, such as for example those having the general formula

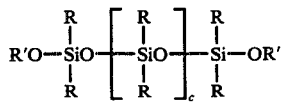

where R and R' are the same as above and c has a value sufficient to provide a viscosity of from 50 to 1,000,000 centipoise at 25° C. It is preferred that the R groups be methyl groups. Suitable organopolysiloxanes are disclosed in U.S. Pat. Nos. 2,415,389; 2,815,300 and 3,161,614.

The hydrocarbonoxy containing organopolysiloxanes represented by Formula I can be prepared by several methods. For example, the organopolysiloxanes may be prepared by reacting in the absence of moisture, hydroxylated siloxanes of the formula

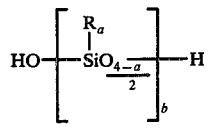

with silanes of the formula

wherein R, R', a and b are the same as above, R" represents monovalent hydrocarbon radicals and halogenated monovalent hydrocarbon radicals having from 1 to 18 carbon atoms and n is 0, 1 or 2 in the absence or presence of a catalyst which promotes the reaction of an SiOH with a silicon bonded OR' group. Examples of suitable catalysts which may be employed are amines and carboxylic acid salts of metals such as lead, tin and iron. When the reaction is conducted in the absence of a catalyst, the mixture is preferably heated to the reflux temperature of the silane. However, when a catalyst is employed, the reaction may proceed at room temperature up to the reflux temperature of the silane. In carrying out this reaction at least 1 mol of the silane should be used per mol of SiOH in the siloxane and more preferably from 1 to 10 mols of silane may be used per mol of SiOH in the siloxane. Preferably the by-product alcohol is removed, although it is not essential.

Another method for preparing the hydrocarbonoxy containing organopolysiloxanes is to react the above hydroxylated organopolysiloxane with a chlorosilane of the formula $R_n SiCl(OR')_{3-n}$ in the presence of a hydrogen halide acceptor such as pyridine, alpha-picoline or other tertiary amines. Under these conditions the chlorine on the silane reacts with the hydroxyl groups on the siloxane to form HCl and cause linking of the silane with the siloxane through an Si-O-Si linkage.

The siloxanes containing hydrocarbonoxy groups may also be prepared by reacting a halogen endblocked siloxane of the formula

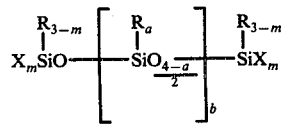

with an alcohol of the formula R'OH in the presence of a halide acceptor such as described above. This reaction proceeds at room temperature and the number of OR' groups on the silicon atom will correspond to the number of halogen atoms in the original siloxane.

The curable compositions of this invention include organosilicon compounds (2) selected from silanes having the general formula

    II and/or siloxanes of the general formula

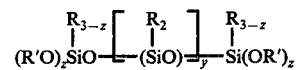    III in which R, R', R" and n are the same as above, y has a value of from 0 to 10 and z has a value of 1, 2 or 3.

Examples of suitable monovalent hydrocarbon radicals are alkyl radicals such as methyl, ethyl, propyl, butyl, octyl and octadecyl radicals; cycloalkyl radicals such as cyclopentyl and cyclohexyl radicals; aryl radicals such as the phenyl radical; aralkyl radicals such as the benzyl radical, the alpha-,beta-phenyl ethyl and alpha-,beta-phenyl propyl radicals; alkaryl radicals such as the tolyl, xylyl and ethyl phenyl radicals; halogenated derivatives of the aforesaid radicals including chloromethyl, trifluoromethyl, chloropropyl, chlorophenyl, dibromophenyl, tetrachlorophenyl and difluorophenyl radicals.

Examples of suitable silanes represented by Formula II above which may be employed in the composition of this invention are methyltrimethoxysilane, methyltriethoxysilane, methyltributoxysilane, methyltrihexoxysilane, methyltridecoxysilane, ethyltrimethoxysilane, ethyltributoxysilane, ethyltridecoxysilane, butyltrimethoxysilane, butyltributoxysilane, butyltridecoxysilane, octyltrimethoxysilane, octyltriethoxysilane, octyltributoxysilane, octyltridecoxysilane, dimethyldimethoxysilane, dimethyldipropoxysilane, dimethyldihexoxysilane, dimethyldioctoxysilane, dimethyldioctoxysilane, diethyldiethoxysilane, diethyldibutoxysilane, diethyldioctoxysilane, diethyldidecoxysilane, dipropyldimethoxysilane, dipropyldibutoxysilane, dipropyldioctoxysilane, dibutyldimethoxysilane, dibutyldiethoxysilane, dibutyldipropoxysilane, dibutyldioctoxysilane, dihexyldiethoxysilane, dihexyldipropoxysilane, dihexyldibutoxysilane, dihexyldihexoxysilane, dioctyldimethoxysilane, dioctyldipropoxysilane, dioctyldibutoxysilane, dioctyldioctoxysilane, tetramethoxysilane, tetraethoxysilane, tetrabutoxysilane, tetrahexoxysilane, tetraoctoxysilane and partial hydrolyzates thereof such as the alkylpolysilicates, e.g., ethylsilicate "40," polypropylsilicates and polybutylsilicates.

Examples of siloxanes represented by Formula III above having at least two hydrocarbonoxy groups per molecule are 1,2-dimethoxy-1,1,2,2-tetramethyldisiloxane, 1,2-dimethyl-1,1,2,2-tetraethoxydisiloxane, 1,1,1,2,2,2-hexamethoxydisiloxane. As mentioned heretofore it is preferred that the siloxanes represented by Formula III have less than 10 silicon atoms per molecule.

Titanium compounds (3) which may be employed in the compositions of this invention are titanium esters having the formula $Ti(OR')_4$ in which R' is an alkyl radical having from 1 to 10 carbon atoms. Specific examples of titanium esters which are operative herein are titanium esters of monohydrate alcohols such as tetramethyltitanate, tetraethyltitanate, tetraisopropyltitanate, tetrapropyltitanate, tetrabutyltitanate, tetra-(2-ethylhexyl)titanate, tetrahexyltitanate, tetraoctyltitanate and tetradecyltitanate. Partial hydrolyzates of any of the above titanates are also operative herein. Preferably, the partial hydrolyzates are benzene soluble polyesters which have at least one Ti-O-Ti linkage in the molecule.

The proportions of silanes or siloxanes and titanium esters or their products of hydrolysis may vary within fairly wide limits. In the case of the silane and/or siloxane the weight ratio of silane or siloxane to organopolysiloxane may vary from 1 to 10 to 1 to 50 and more preferably from 1 to 15 to 1 to 30 while the weight ratio of titanium ester to organopolysiloxane may vary from 1 to 15 to 1 to 40 and more preferably from 1 to 10 to 1 to 30. Generally it is preferred that the silane or siloxane and titanium ester be used in the same ratio. It is to be understood that the proportions are by weight based on the weight of the diorganopolysiloxane of Formula I.

In some cases, it may be advantageous to mix the titanium ester or silane in an inert liquid so as to facilitate uniform dispersion or solution in the organopolysiloxane. For this purpose, aliphatic hydrocarbons, cyclic aliphatic hydrocarbons such as cyclohexane, monomethylcyclohexane, aromatic compounds such as benzene, toluene, xylene, halogenated alkanes, mineral spirits or esters such as ethyl acetate may be employed.

Although it is not essential, often times it is preferred that fillers be incorporated in these compositions in order to impart desirable physical properties thereto. Examples of suitable fillers are treated fumed silicas, high surface area precipitated silicas, silica aero gels as well as coarser silicas such as diatomaceous earth, crushed quartz and the like. Other fillers which may be used are metallic oxides such as titanium oxide, ferric oxide, zinc oxide and fibrous fillers such as asbestos, fibrous glass and the like.

Even though the particle size of the filler is not critical, it is preferred that it range from about 5 millimicrons up to about 30 microns in diameter. Particles having a larger diameter may be used; however they may be more difficult to incorporate in the composition.

The mineral fillers may be used in an amount of from 0 up to about 200 percent based on the weight of the organopolysiloxane (1).

It is essential that these fillers be free of residual water, hydroxyl groups and any other groups which may react with the titanium ester and the hydrocarbonoxy groups linked in the silicon atoms of the organopolysiloxanes and organosilicon compounds. It is preferred that the fillers be treated with organosilicon compounds to impart hydrophobic properties thereto.

Organosilicon compounds which may be used to impart hydrophobic properties to fillers are those having the general formula

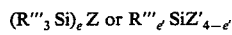

wherein $R'''$ which may be the same or different represents monovalent hydrocarbon radicals and halogenated monovalent hydrocarbon radicals, Z and Z' represents halogen, hydrogen or a radical of the formula —OR'''', —NR''''X', —ONR'''', —SR'''' or —OOCR'''' and when $e$ is 2, then Z may also represent —O—, —NX'— or —S—; R'''' is a hydrocarbon radical or a substituted hydrocarbon radical, preferably an alkyl radical having from 1 to 4 carbon atoms; X' is hydrogen or has the same meaning as R''''; $e$ is 1 or 2 and $e'$ is 1, 2 or 3.

It is essential that any residue resulting from the treatment of the filler be removed prior to incorporating the treated filler in the compositions of this invention. Thus, the treated filler should be substantially free of the groups represented by Z and Z'.

The monovalent and halogenated monovalent hydrocarbon radicals represented by R''' may be the same as the SiC-bonded organic radicals R'' linked to the organosilicon compounds. Suitable hydrocarbon radicals having from 1 to 18 carbon atoms are alkyl radicals, cycloalkyl radicals, alkenyl radicals, aryl radicals, alkaryl radicals, aralkyl radicals and halogenated derivatives thereof.

Examples of halogen atoms represented by Z and Z' are chlorine, bromine and iodine, with chlorine being the preferred example since it is readily available.

Suitable examples of hydrocarbon radicals represented by R''' are the methyl and the ethyl radicals. Additional examples of hydrocarbon radicals represented by R''' and R'''' are described in the following examples of organosilicon compounds which may be used to treat the fillers.

Examples of substituted hydrocarbon radicals represented by R''' are the methoxyethylene radical and the aminoethyl radical.

Suitable examples of organosilicon compounds which are known to impart hydrophobic properties to various fillers are hexamethyldisilizane, trimethylethoxysilane, trimethylchlorosilane, dimethyldiethoxysilane, vinyldimethylacetoxysilane, trimethylsilylisopropylamine, trimethylsilylethylamine, phenyldimethylsilypropylamine, vinyldimethylsilylbutylamine, diethylaminoxytrimethylsilane, diethylaminoxyphenyldimethylsilane, 1,3-diphenyltetramethyldisilazane, dimethyldichlorosilane, dimethyldimethoxysilane, diphenyldiethoxysilane, vinylmethyldimethoxysilane and methyltriethoxysilane. It is preferred that the organosilicon compounds employed in the treatment of the fillers be hexamethyldisilizane. When silanes containing hydrocarbonoxy groups are employed in the treatment of the fillers, the hydrocarbonoxy groups should be identical with the ester group on the titanium compound and the hydrocarbonoxy group linked to the silicon atoms of the organopolysiloxanes and organosilicon compounds.

Apart from the fillers mentioned heretofore, additives such as pigments, antioxidants, ultraviolet absorbents, fungicides, plasticizers and internal plasticizers may be included in the compositions of this invention. Here again it is essential that the additives be free of residual water, hydroxyl groups or other groups which would react with the titanium ester or the hydrocarbonoxy groups linked to the silicon atoms of the organopolysiloxanes and organosilicon compounds.

Compounds which have been used heretofore as plasticizers may be incorporated in the compositions of this invention. Examples of suitable compounds are triorganosiloxy-endblocked diorganopolysiloxanes having a viscosity of from 50 to 250 centipoise at 25° C, such as trimethylsiloxy-endblocked dimethylpolysiloxanes, trimethylsiloxy-endblocked methylphenylpolysiloxanes, triethylsiloxyendblocked diethylpolysiloxanes and mixtures thereof. Organopolysiloxanes which are endblocked on one end with at least one terminal hydrocarbonoxy group and on the other end with a triorganosiloxy group may also be employed in the compositions of this invention. These organopolysiloxanes have been defined as internal plasticizers. However, it is essential that the terminal hydrocarbonoxy groups on the internal plasticizers be the same group as the hydrocarbonoxy groups linked to the silicon atoms in the organopolysiloxane, the organosilicon compound and the titanium ester.

The compositions of this invention may be conveniently prepared by mixing the reactants at room temperature in the absence of moisture in an apparatus provided with a stirrer and a discharging device for packaging the product in a closed receptacle. It is preferred that the silane or siloxane and the titanium ester be added to the organopolysiloxane and the products thus obtained whose consistency varies from that of a liquid to that of a firm paste be transferred into fluid-tight receptacles in which they can be kept for several months. The resultant compositions are stable in the absence of moisture, consequently they can be stored for prolonged periods of time without deleterious affects. During this period of storage, little or no change occurs in the physical or application properties of the compositions. This is of particular importance from a commercial standpoint since it assures that once a composition is prepared with a certain consistency and cure time, that neither will change to any great extent upon storage. Moreover, it has been found that these compositions may be stored for long periods of time without changes occurring in the property profile of the resultant elastomer. This stability on storage is the characteristic which makes the compositions of this invention particularly useful as a one-component room temperature curable composition.

These compositions may be employed for many applications. They are useful for caulking, coating articles, for example electronic equipment, for coating fabrics, coating glass, metal and as sealants for various substrates.

Upon exposure to a moist atmosphere these compositions cure to an elastomeric solid. The moisture present in the ambient air is generally sufficient for this treatment, but it is also possible to expose the product which is to be cured, to an atmosphere artificially charged with moisture. Although the curing can take place without difficulty at room temperature, that is to say at from about 15° to 25° C, it is possible if desired to operate at an elevated temperature and even in a hot moist atmosphere such as steam.

The duration of the curing may be varied within fairly wide limits. Thus it depends upon the nature of the diorganopolysiloxane, upon the proportion of organosilicon compound and titanium ester in the composition, upon the thickness of the application, upon the degree of humidity and upon temperature. At ambient temperatures and in air the compositions are normally cured in a period of between several hours up to about 7 days.

In the following examples all parts are by weight unless otherwise specified.

Treatment of Filler

Finely divided fumed silica having a surface area of at least 50 square meters per gram is placed in a drum roller with from 2 to 10 percent by weight of water and from 10 to 25 percent by weight based on the weight of filler of hexamethyldisilazane and the mixture is tumbled for from 10 to 18 hours at a temperature of from about 15 up to about 50° C. The treated silica filler is then placed in an air oven and dried at from 100° to 150° C for 10 to 24 hours.

EXAMPLE I (A)

To a 500 milliliter glass reactor equipped with a stirrer, nitrogen inlet and reflux condenser are added 200 parts of a hydroxylterminated dimethylpolysiloxane fluid having a viscosity of 4000 centipoise at 25° C, 60 parts of a trimethylsiloxy-endblocked dimethylpolysiloxane fluid having a viscosity of 50 centipoise at 25° C and 26 parts of tetraethyl orthosilicate. The system is flushed with nitrogen and heated to a temperature of about 170° C with agitation and refluxed for 18 hours. After stripping for about 6 hours at a temperature of from 110° to 120° C. a triethoxy-endblocked dimethylpolysiloxane fluid is recovered.

(B)

About 100 parts of the triethoxy-endblocked dimethylpolysiloxane fluid prepared in (A) above are mixed with 35 parts of the treated filler described above. About 5 parts of tetraethyltitanate and 5 parts of methyltriethoxysilane are added to the mixture and mixed under anhydrous conditions for 10 minutes. The mixture is placed in air-tight tubes and after storing at room temperature, the physical properties are determined at periodic intervals in accordance with ASTM, D-412. The results are shown in the following table.

| | Physical Properties | | | |
|---|---|---|---|---|
| Time Interval (days) | Durometer, Shore A | Tensile strength, psi | Elongation % | Tear strength lb/in. |
| 7 | 45 | 567 | 352 | 199 |
| 28 | 40 | 585 | 390 | 151 |
| 42 | 43 | 577 | 403 | 173 |
| 60 | 40 | 532 | 364 | 163 |
| 180 | 36 | 533 | 441 | 163 |

EXAMPLE 2

(A)

About 600 parts of a hydroxyl-terminated dimethylpolysiloxane having a viscosity of 4000 centipoise at 25° C are reacted with 60 parts of methyltrimethoxysilane at reflux temperature for 12 hours. After stripping the reaction mass at a temperature of from 110° to 120° C for 5 hours, a methyldimethoxy-endblocked dimethylpolysiloxane fluid is recovered.

(B)

About 100 parts of the methyldimethoxy-endblocked dimethylpolysiloxane fluid prepared in (A) above are mixed with 20 parts of a trimethylsiloxy-endblocked dimethylpolysiloxane fluid having a viscosity of 50 centipoise at 25° C and 35 parts of the treated filler described above. About 10 parts of tetramethyl titanate and 5 parts of methyltrimethoxysilane are added to the mixture and mixed under anhydrous conditions for 10 minutes. The mixture is then placed in air-tight tubes and after storing for periodic intervals at room temperature, the physical properties are determined in accordance with ASTM, D-412. The results are shown in the following table.

| Physical Properties | | | |
|---|---|---|---|
| Time Interval (days) | Durometer, Shore A | Tensile strength, psi | Elongation % | Tear strength lb/in. |
| 7 | 33 | 383 | 374 | 124 |
| 28 | 43 | 307 | 264 | 115 |
| 42 | 40 | 303 | 250 | 110 |

EXAMPLE 3

(A)

A methyl diethoxy-endblocked dimethylpolysiloxane is prepared in accordance with the procedure described in Example 2 (A) above except that methyltriethoxysilane is substituted for the methyltrimethoxysilane.

(B)

About 100 parts of the methyldiethoxy-endblocked dimethylpolysiloxane fluid described above are mixed with 20 parts of a trimethylsiloxy-endblocked dimethylpolysiloxane fluid having a viscosity of 50 centipoise at 25° C and 35 parts of the treated filler described above. About 5 parts of methyltriethoxysilane and 5 parts of tetraethyltitanate are added to the mixture and mixed undder anhydrous conditions for 10 minutes. The mixture is then placed in air-tight tubes and after storing at room temperature, the physical properties are determined at periodic intervals in accordance with ASTM, D-412. The results are shown in the following table.

| Physical Properties | | | |
|---|---|---|---|
| Time Interval (days) | Durometer, Shore A | Tensile strength, psi | Elongation % | Tear strength lb/in. |
| 7 | 32 | 456 | 554 | 124 |
| 28 | 41 | 394 | 429 | 149 |
| 42 | 32 | 441 | 521 | 122 |

EXAMPLE 4

About 120 parts of the methyldiethoxy-endblocked dimethylpolysiloxane fluid prepared in Example 3 (A) above are mixed with 35 parts of the treated filler described above. About 5 parts of tetraethyl orthosilicate and 5 parts of tetraethyltitanate are added to the mixture and mixed under anhydrous conditions for 10 minutes. The mixture is then placed in air tight tubes and after storing at room temperature, the physical properties are determined at periodic intervals in accordance with ASTM, D-412. The results are shown in the following table.

| Physical Properties | | | |
|---|---|---|---|
| Time Interval (Days) | Durometer, Shore A | Tensile strength, psi | Elongation % | Tear strength lb/in. |
| 7 | 32 | 456 | 554 | 126 |
| 28 | 41 | 394 | 429 | 149 |
| 42 | 32 | 441 | 521 | 122 |
| 120 | 37 | 460 | 481 | 130 |

EXAMPLE 5

The procedure of Example 4 is repeated except that 5 parts of 1,2-dimethyl-1,1,2,2-tetraethoxydisiloxane are substituted for the tetraethyl orthosilicate.

The physical properties are determined after 7 days and again after 42 days and found to be substantially the same.

EXAMPLE 6

The procedure described in Example 1 (A) is repeated except a tetrapropyl silicate is substituted for the tetraethyl orthosilicate.

About 100 parts of the tripropoxy-endblocked dimethylpolysiloxane prepared above are then mixed with 35 parts of a fumed silica filler treated with methyltripropoxysilane in accordance with the procedure described above, 5 parts of tetrapropyltitanate and 5 parts of methyltripropoxysilane and then placed in air-tight tubes. The physical properties are determined after 7 days and again after 42 days and found to be substantially the same.

EXAMPLE 7

The procedure described in Example 1 (A) is repeated except that ethylsilicate "40" is substituted for tetraethyl orthosilicate.

The physical properties are determined after 7 days and again after 42 days and found to be substantially the same.

COMPARISON EXAMPLE $V_1$

About 100 parts of the dimethoxy-endblocked dimethylpolysiloxane fluid prepared in Example 2 (A) above are mixed with 20 parts of a trimethylsiloxy-endblocked dimethylpolysiloxane having a viscosity of 50 centipoise at 25° C and 35 parts of the filler described above. About 5 parts of tetraisopropyltitanate and 5 parts of methyltrimethoxysilane are added to the mixture and mixed under anhydrous conditions for 10 minutes. The mixture is then placed in air-tight tubes and after storing for periodic intervals at room temperature, the physical properties are determined in accordance with ASTM, D-412. The results are shown in the following table.

| Physical Properties | | | |
|---|---|---|---|
| Time Interval (Days) | Durometer, Shore A | Tensile strength psi | Elongation, % | Tear strength lb/in. |
| 7 | 45 | 476 | 355 | 110 |
| 28 | 43 | 355 | 265 | 47 |
| 42 | 42 | 315 | 251 | 45 |

This example shows that when a mixed system is employed, i.e., methoxy and isopropoxy groups are present in the composition, there is a substantial change in the property profile over a period of 28 days when compared to a matched system having for example all methoxy groups, such as shown in Example 2.

COMPARISON EXAMPLE $V_2$

The procedure of Comparison Example $V_1$ is repeated except that 10 parts of tetraisopropyltitanate are added. The physical properties of the resultant composition are shown in the following table.

| Physical Properties | | | |
|---|---|---|---|
| Time Intervals (Days) | Durometer Shore A | Tensile strength psi | Elongation, % | Tear strength lb/in. |
| 7 | 34 | 469 | 493 | 173 |
| 28 | 40 | 241 | 264 | 120 |
| 60 | 38 | 300 | 315 | 93 |
| 120 | 36 | 265 | 315 | 30 |

COMPARISON EXAMPLE V₃

The procedure of Comparison Example V₁ is repeated, except that 10 parts of methyltrimethoxysilane are added. The physical properties of the resultant composition are shown in the following table.

| | Physical Properties | | | |
|---|---|---|---|---|
| Time Interval (days) | Durometer Shore A | Tensile strength psi | Elongation % | Tear strength lb/in. |
| 7 | 47 | 647 | 457 | 195 |
| 28 | — | 347 | — | 151 |
| 60 | 46 | 544 | 354 | 124 |
| 120 | 47 | 408 | 304 | 102 |
| 150 | 41 | 346 | 338 | 47 |

Comparison Examples V₂ and V₃ show that even by varying the ratio of the organosilicon compound to the titanate ester, that the property profile, especially tear strength, of the resultant composition changes substantially over a 28 day period.

COMPARISON EXAMPLE V₄

The procedure of Example V₁ is repeated except that a triethoxy-endblocked dimethylpolysiloxane fluid prepared in Example 1 (A) is substituted for the dimethoxy-endblocked dimethylpolysiloxane fluid.

The physical properties are determined after 7 days and again after 42 days. The physical properties are very similar to those shown in Comparison Example V₁.

What is claimed is:

1. An organopolysiloxane composition which is stable under anhydrous conditions but when exposed to atmospheric moisture cures to an elastomeric solid at room temperature comprising (1) an organopolysiloxane of the formula

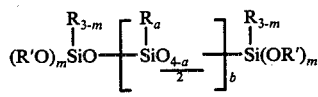

(2) an organosilicon compound selected from the group consisting of silanes of the formula $R''_n Si(OR')_{4-n}$ and siloxanes of the formula

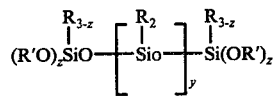

and (3) a titanium compound of the formula $Ti(OR')_4$ and hydrolyzates thereof in which R is selected from the group consisting of monovalent hydrocarbon radicals, halogenated monovalent hydrocarbon radicals and cyanoalkyl radicals, R' is an aliphatic hydrocarbon radical having up to 10 carbon atoms, R" is selected from the group consisting of monovalent hydrocarbon radicals and halogenated monovalent hydrocarbon radicals, $a$ has an average value of from 1.9 to 2.0, $b$ has a value greater than 10, $m$ has a value of at least 1, $n$ has a value of 0, 1 or 2, $y$ has a value of from 0 to 10 and $z$ has a value of 1, 2 or 3, with the proviso that the R' radicals in the siloxane, the organosilicon compound and the titanium compound must be identical.

2. The composition of claim 1, wherein the radicals represented by R' are alkyl radicals.

3. The composition of claim 1, wherein the organopolysiloxane (1) has the formula

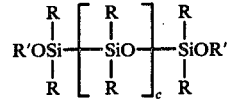

in which R is selected from the group consisting of monovalent hydrocarbon radicals, halogenated monovalent hydrocarbon radicals and cyanoalkyl radicals, R' is an aliphatic hydrocarbon radical having up to 10 carbon atoms, $c$ has a value sufficient to provide a viscosity of from 50 to 1,000,000 centipoise at 25° C.

4. The composition of claim 3, wherein R is an alkyl radical.

5. The composition of claim 4, wherein R is a methyl radical.

6. The composition of claim 1, wherein the organosilicon compound (2) has the formula $R''_n Si(OR')_{4-n}$ in which R' is an aliphatic hydrocarbon radical having up to 10 carbon atoms, R" is selected from the group consisting of monovalent hydrocarbon radicals and halogenated monovalent hydrocarbon radicals and $n$ has a value of 0, 1 or 2.

7. The composition of claim 6, wherein R' and R" are alkyl radicals and $n$ is 1.

8. The composition of claim 6, wherein the organosilicon compound (2) is methyltriethoxysilane.

9. The composition of claim 6, wherein R' is an alkyl radical and $n$ is 0.

10. The composition of claim 6, wherein the organosilicon compound (2) is tetraalkyl orthosilicate.

11. The composition of claim 10, wherein the tetraalkyl orthosilicate is tetraethyl orthosilicate.

12. The composition of claim 1, wherein the organosilicon compound (2) is a siloxane of the formula

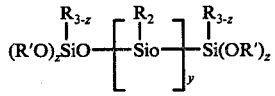

in which R is selected from the group consisting of monovalent hydrocarbon radicals, halogenated monovalent hydrocarbon radicals and cyanoalkyl radicals, R' is an aliphatic hydrocarbon radical having from 1 to 10 carbon atoms, $y$ has a value of from 0 to 10 and $z$ has a value of 1, 2 or 3.

13. The composition of claim 12, wherein R is an alkyl radical, R' is an alkyl radical, $y$ is 0 and $z$ is 2.

14. The composition of claim 1, wherein the titanium compound is a titanium ester.

15. The composition of claim 1, wherein R' is a methyl radical.

16. The composition of claim 1, wherein R' is an ethyl radical.

17. The composition of claim 1, which includes a hydrophobic filler.

18. A method for preparing the composition of claim 1 which comprises mixing under anhydrous conditions (1) an organopolysiloxane of the formula

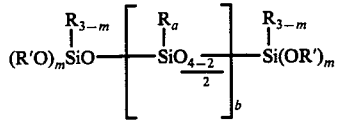

(2) an organosilicon compound selected from the group consisting of silanes of the formula $R''_n Si(OR')_{4-n}$ and siloxanes of the formula

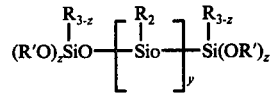

and (3) a titanium compound of the formula $Ti(OR')_4$ and hydrolyzates thereof in which R is selected from the group consisting of monovalent hydrocarbon radicals, halogenated monovalent hydrocarbon radicals and cyanoalkyl radicals, R' is an aliphatic hydrocarbon radical having up to 10 carbon atoms, R" is selected from the group consisting of monovalent hydrocarbon radicals and halogenated monovalent hydrocarbon radicals, $a$ has an average value of from 1.9 to 2.0, $b$ has a value greater than 10, $m$ has a value of at least 1, $n$ has a value of 0, 1 or 2, $y$ has a value of from 0 to 10 and $z$ has a value of 1, 2 or 3, with the proviso that the R' radicals in the siloxane, the organosilicon compound and the titanium compound must be identical.

19. A method for curing the composition of claim 1 to an elastomeric solid which comprises exposing the composition to atmospheric moisture.

20. The cured composition of claim 1.

* * * * *